United States Patent [19]

Christopher, Jr. et al.

[11] Patent Number: 5,301,312
[45] Date of Patent: Apr. 5, 1994

[54] METHOD AND SYSTEM FOR UTILIZING BENIGN FAULT OCCURRENCE TO MEASURE INTERRUPT-BLOCKING TIMES

[75] Inventors: Kenneth W. Christopher, Jr., Lighthouse Point; Khoa D. Huynh, Miami; Virginia M. Roarabaugh, Boca Raton; Theodore C. Waldron, III, Sunrise, all of Fla.

[73] Assignee: International Business Machines Corporation, Armonk, N.Y.

[21] Appl. No.: 748,149

[22] Filed: Aug. 21, 1991

[51] Int. Cl.$^5$ .................... G06F 11/30; G06F 11/00
[52] U.S. Cl. ................................ 395/575; 371/19
[58] Field of Search ............. 371/17, 19; 395/575; 364/242, 808, 941, 941.6, 950.4, 950.5

[56] References Cited

U.S. PATENT DOCUMENTS

| | | | |
|---|---|---|---|
| 3,813,531 | 5/1975 | King et al. | 371/17 |
| 4,314,329 | 2/1982 | Crewe et al. | 364/900 |
| 4,590,550 | 5/1986 | Eilert | 364/200 |
| 4,601,008 | 7/1986 | Kato | 364/900 |
| 4,635,193 | 1/1987 | Mayer et al. | 371/200 |
| 4,638,452 | 1/1987 | Schultz et al. | 364/900 |
| 4,775,957 | 10/1988 | Yakuwa et al. | 364/900 |
| 4,791,557 | 12/1988 | Angel et al. | 364/200 |
| 4,910,663 | 4/1990 | Bailey | 364/200 |
| 4,974,159 | 11/1990 | Hargrove | 364/200 |
| 5,047,919 | 9/1991 | Sterling et al. | 364/200 |

OTHER PUBLICATIONS

Hedeman, III, *Program to Count Microcode Instructions* IBM Technical Disclosure Bulletin, vol. 16, No. 1, Jun. 1973.

*Primary Examiner*—Robert W. Beausoliel, Jr.
*Assistant Examiner*—Trinh Tu
*Attorney, Agent, or Firm*—Duke W. Yee; Andrew J. Dillon

[57] ABSTRACT

A method in a computer system for monitoring time intervals during which external interrupts are inhibited within the computer system in a selected program being run on the computer system. The method and apparatus of the present invention includes identifying a first plurality of instructions, capable of blocking external interrupts and identifying a second plurality of instructions, capable of unblocking external interrupts. After identifying these instructions, a unique benign fault is inserted proximate to selected ones of the first plurality of instructions and selected ones of the second plurality of instructions to produce a special version program. The special version program is then run in the computer system. Faults which occur during the running of the special version program and associated external interrupt-blocking times are monitored.

30 Claims, 5 Drawing Sheets

METHOD AND SYSTEM FOR UTILIZING BENIGN FAULT OCCURRENCE TO MEASURE INTERRUPT-BLOCKING TIMES

BACKGROUND OF THE INVENTION

1. Field of the Invention

The present invention relates in general to the field of software monitoring and development and in particular to methods and systems which permit accurate measuring of time intervals during which external interrupts are inhibited. Still more particularly, the present invention relates to methods and systems for software monitoring and development which permit the measurement of time intervals during which external interrupts are inhibited without requiring specialized measurement hardware.

2. Description of the Prior Art

Virtually all modern computer systems must have the capability to response to external events in a fast and predictable manner. The most common method for responding to these external events is to present them as interrupts to the system. Most operating systems, however, sometimes block or disable external interrupts to protect the integrity of system data structures while these structures are being accessed or during state transitions. In addition, some applications can also inhibit interrupts to protect integrity of its data structures.

Consequently, interrupt-blocking intervals, i.e., periods during which the system cannot respond to external interrupts, do have a negative effect of the overall responsiveness of the system. Moreover, interrupt-blocking is also the main cause for large and unpredictable interrupt latency, which can be roughly defined as the amount of time it takes for the system to respond to external events.

On a typical computer, all external events, in the form of prioritized interrupts, are usually presented first to an interrupt controller. This interrupt controller has the responsibility to resolve the priority differences among simultaneous interrupts. The interrupt with the highest priority then proceeds to the processor. When the processor hardware detects an interrupt being directed at it, the processor hardware must first determine whether the interrupt may be serviced.

An interrupt may be serviced if the processor is not in a state where external interrupts are blocked and, if there is one interrupt level already active, the incoming interrupt level must have higher priority. Once these conditions are met, an interrupt vector table, i.e., the Interrupt Descriptor Table ("IDT") in the Intel 80386 microprocessors architecture, is searched for the entry of the incoming interrupt level. Intel 80386 and 80486 microprocessors are products of Intel Corporation. More information on the Intel 803865, 80486 microprocessors can be found in the 1486 Microprocessor Programmers Reference Manual from the Intel Corporation. This table entry contains a vector to some code, usually called the interrupt handler or interrupt manager, which is responsible for processing the interrupt. The current program status (registers, program counter, and other information), which represents the state of the processor at the time of the interrupt, is then saved in some data structure in memory, and a new program status is loaded into the processor hardware, causing the interrupt handler to begin execution.

Upon completion of execution by the handler, the processor may do one of the following: (1) switch back to the point at which it was interrupted by reloading the program status saved at the time of interrupt, (2) enter the scheduler to schedule the most eligible task in the system to execute, or (3) on some real-time systems, execute the user task that is defined as being "connected" to the interrupt. Assuming that the interrupt handler and the scheduler are highly optimized, the system, including the kernel and applications, must not block interrupts for any long period of time because doing so would adversely effect the ability of the system to respond to external interrupts.

Most processors have explicit instructions which are utilized to block and unblock interrupts in their instruction sets. The Intel 80386 and 80486 processors have the CLI (Clear Interrupt flag) and STI (Set Interrupt flag) instructions. When a interruptblocking instruction is executed, the processor will set an interrupt flag, usually stored in some system register in the processor, to block all external interrupts (with the possible exception of non-maskable interrupts). The processor hardware will continue to block interrupts until an unblock-interrupt instruction is executed, in which case the interrupt flag will be Thus, an effective method to measure interrupt-blocking times must keep track of these instructions in the execution path. In addition, some processors also block external interrupts via indirect means, such as:

(1) Task switches: some processors, such as the Intel 80386/80486, load the system registers, including the interrupt flag, on task switches. In this case, if the interrupt flag is cleared after the system registers are loaded, the processor would inhibit external interrupts until this flag is set.

(2) Interrupt gates: some processors automatically disable further interrupts immediately after being interrupted. On the Intel 386/486 processors, external interrupts going through interrupt gates automatically clear the interrupt flag.

(3) Interrupt returns (from interrupt procedures): in many operating systems, the system registers are reloaded upon returning from the interrupt handlers or procedures. The reloading of the system registers normally include the interrupt flag, which has control over whether the processor disables interrupts or not in its new state. If the system registers are restored to its original state at the point of interrupt, the interrupt flag would be set, indicating that interrupts are enabled.

Thus, any effective method to measure interrupt-blocking times must not only be able to keep track of explicit instructions that block or unblock interrupts, but must also be able to detect all cases, e.g., task switches, interrupt gates, and interrupt returns, where the processor's interrupt state (flag) is altered. By keeping track of all instances where interrupts are disabled and enabled, calculating the time intervals during which external interrupts are blocked is possible. The longest interrupt-blocking intervals may be identified precisely, and software developers may then optimize the affected pieces of code to reduce the length of these intervals.

In developing operating systems and applications, developers often desire to measure the length of time during which external interrupts are blocked. These measurements are used to optimize the program being evaluated in terms of the ability of the system to respond to external interrupts.

Presently, there are various methods for measuring the blocking of external interrupts. One method is a sampling method wherein the system is sampled at the rate timer interrupts are generated. Most computer systems have at least one software programmable timer. The timer may be used to generate interrupts to the system at a predetermined rate. Normally, the timer is initialized with an integer count. When the timer counts down to zero, an interrupt will be generated, and if it is configured to have the highest priority among external interrupts, the interrupt controller will present this interrupt first to the processor in the case that there are other competing simultaneous interrupts exist. In the meantime, the timer continues to count negative.

Once the interrupt is presented to the processor and the processor is not in an interrupt-inhibit state, the current program status will be saved, and the processor will vector to some entry point inside a special device driver. This special device driver will then read the timer, and subtract the timer result from zero. The result of this subtraction will represent the time it takes for the system to respond to external (timer) interrupts. On the other hand, if the processor blocks interrupts when the timer interrupt arrives, the time interrupt would be held pending until the processor enables the interrupts again. Once interrupts are enabled, the special device driver will be entered, and the timer will be read. The value obtained in this case, after being subtracted from zero, will thus represent the sum of the hardware response in the interrupt-blocking time. After the driver finishes what it needs to do, it will initialize the timer, and the whole process will repeat again.

After many iterations, the smallest results obtained by the dummy driver would represent the hardware response only, i.e., no interrupt-blocking at all by the processor. The largest results, however, would represent both the hardware response and the interrupt-blocking time. Thus, the difference between the smallest and largest values can be attributed to the interrupt-blocking time.

In other known systems, interrupt timing is not done using the interval timer and a special device driver. Rather, interrupt timing is done by utilizing some external hardware consisting of a pulse generator and a timing device, but this approach is very similar in concept and is also sampling in nature.

This sampling approach contains several weaknesses: (1) it does not report the precise locations at which interrupts are blocked and unblocked; (2) it does not accurately measure interrupt-blocking times and can only approximate these times by looking at the largest and smallest values obtained; (3) because of its sampling nature, this approach does not measure all time intervals during which interrupts are blocked; and (4) the coverage of testing cannot be determined since this approach does not provide precise locations where interrupts are blocked and unblocked.

Another system for evaluating the performance of source code in terms of interrupt-blocking time involves putting so-called "hooks" into the system and application code. Special hooks may be incorporated into the operating system and/or application code to record all occurrences where interrupts are blocked and unblocked. In recording occurrences of blocking and unblocking, a monitoring system may be used in conjunction with specialized hardware which will time-stamp each instance of a hook being encountered.

Systems which utilize hooks also contain several weaknesses such as: (1) careful, time-consuming examination the operating system's code and/or application code is required to determine exactly where external interrupts are blocked or unblocked; (2) interrupt-blocking periods caused by indirect means, such as the processor automatically blocking interrupts immediately after being interrupted are not taken into account; (3) a large amount of hooks placed into numerous places throughout the operating system and/or application code is potentially required; and (4) a separate set of hooks for different versions of the operating system and/or application may be required, and thus, such systems are not very convenient for external customer usage.

In yet another known method, identification macros are utilized to measure the performance of source code in terms of interrupt-blocking time. In this method, a macro is provided for each type of instruction that might block interrupts. At run-time, these macros will identify and attach an identification number on each potential interrupt-blocking instruction. Based on this output, a post-processing tool may be utilized to identify the pairs of instructions that might cause interrupts to be blocked for a substantial amount of time. As a result, test cases may then be written to exercise all of these instruction pairs. This method, however, does not consider all the cases in which interrupts are blocked, e.g., during the services of external interrupts.

Therefore, it should be apparent that a need exists for a software monitoring and development system which permits accurate measurement of interrupt-blocking times in all cases which could cause a processor to inhibit external interrupts.

SUMMARY OF THE INVENTION

It is therefore one object of the present invention to provide an improved method and apparatus for software monitoring and development.

It is another object of the present invention to provide an improved method and apparatus for software monitoring and development which permit accurate measuring of time intervals during which external interrupts are inhibited.

It is yet another object of the present invention to provide an improved method and apparatus for software monitoring and development which permit the measurement of time intervals during which external interrupts are inhibited without requiring measurement hardware.

The foregoing objects are achieved as is now described. The method and apparatus of the present invention provides a method in a computer system for monitoring time intervals during which external interrupts are inhibited within the computer system in a selected program being run on the computer system. The method and apparatus of the present invention includes identifying a first plurality of instructions, capable of blocking external interrupts and identifying a second plurality of instructions, capable of unblocking external interrupts. After identifying these instructions, a unique benign fault is inserted proximate to selected ones of the first plurality of instructions and selected ones of the second plurality of instructions to produce a special version program. The special version program is then run in the computer system. Faults which occur during the running of the special version program and associated external interrupt-blocking times are monitored.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
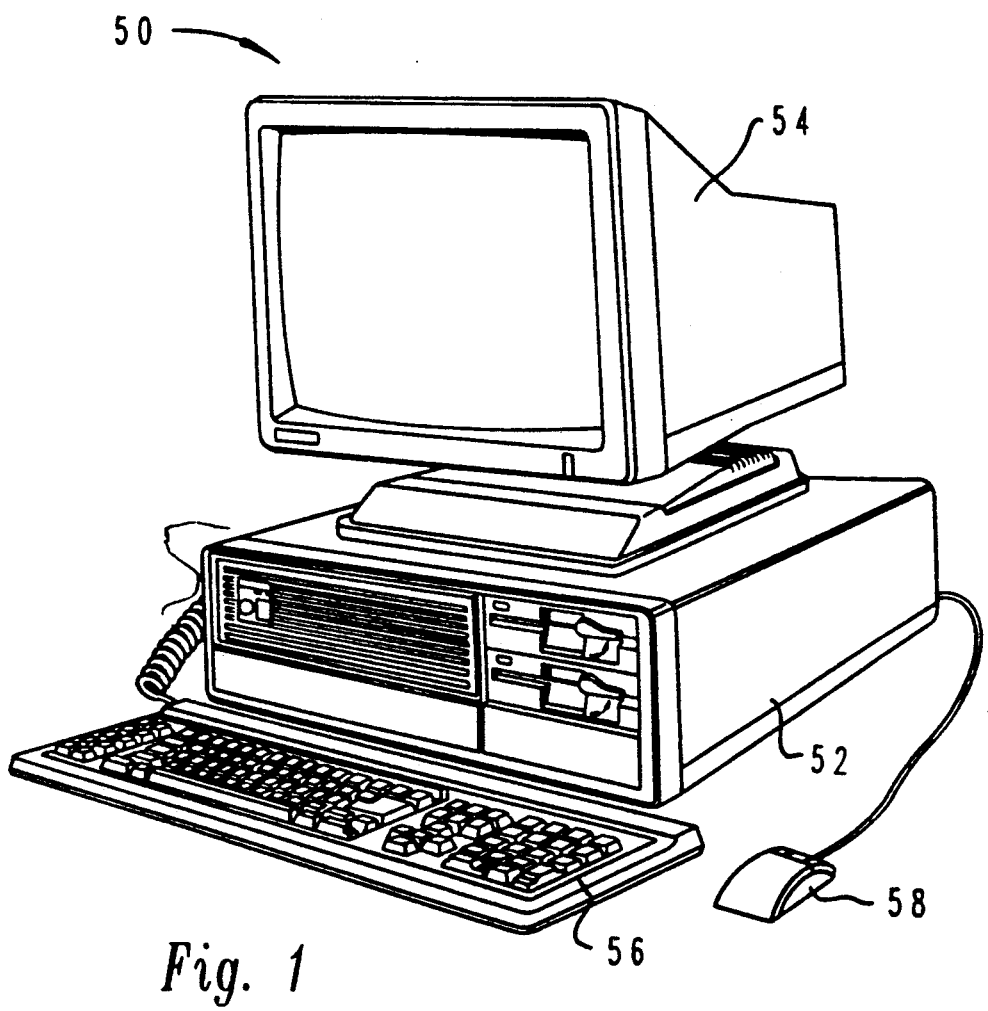
FIG. 1 depicts an example of a computer system in which the present invention can be implemented.

With reference now to the figures and in particular with reference to FIG. 1, there is depicted an example of a computer system in which the present invention can be implemented. A personal computer 50 is depicted which includes a system unit 52, a video display terminal 54, a keyboard 56, and a mouse 58. Personal computer 50 may be implemented utilizing any suitable computer such as the IBM PS/2 computer.

Figure 2:
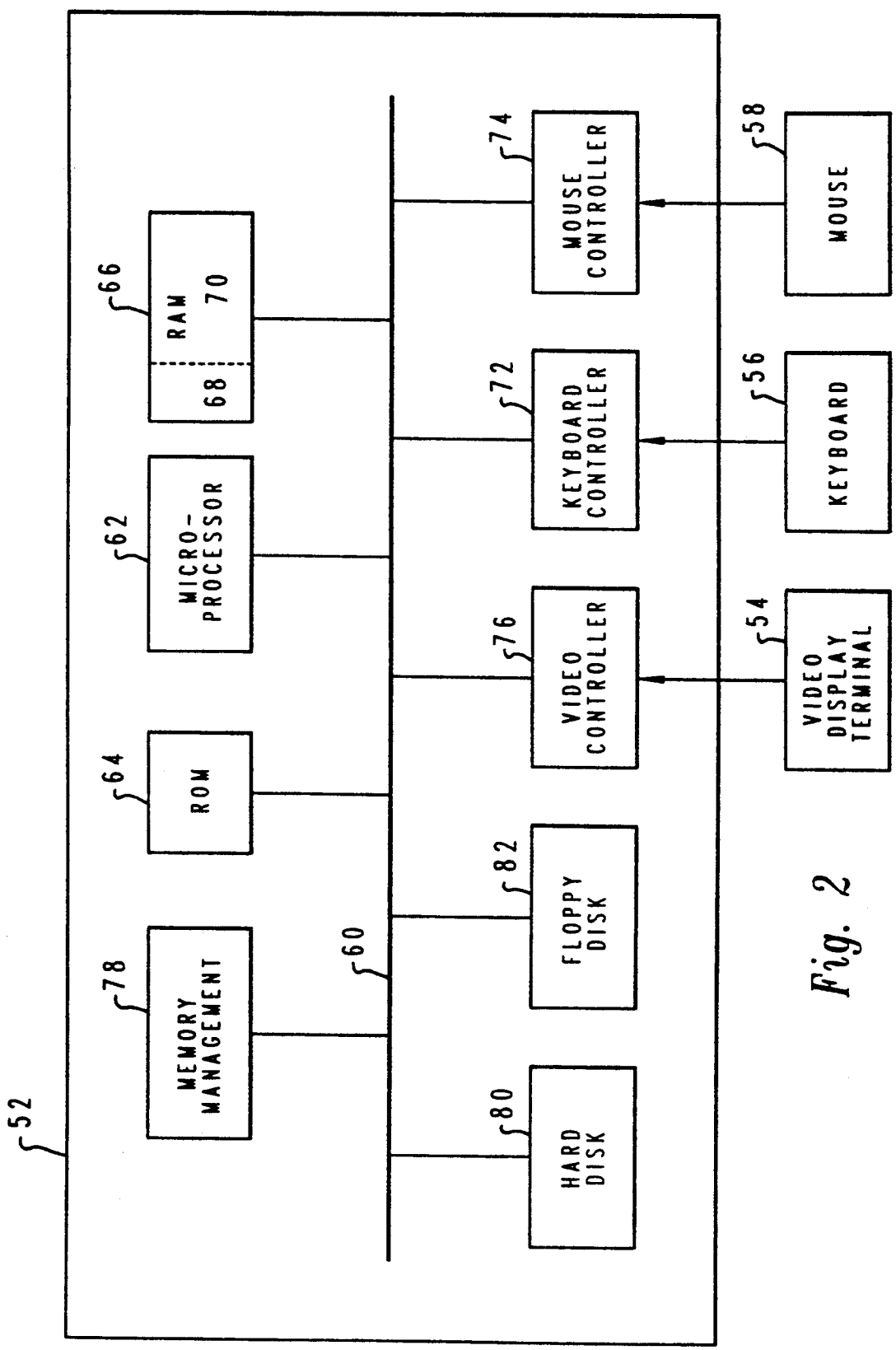
FIG. 2 is a block diagram of the components of the computer system shown in FIG. 1.

FIG. 2 is a block diagram of the components of the computer system shown in FIG. 1. System unit 52 preferably includes a system bus 60 for connecting and establishing communication between various components in system 52 A microprocessor 62, Read Only Memory ("ROM") 64, and Random Access Memory ("RAM") are connected to system bus 60. Microprocessor 62 in a preferred embodiment of the present invention is an Intel 80386 or 80486 microprocessor, but other microprocessors may also be used in a different computer system.

ROM 64, contains, among other code, a Basic Input-/Output System ("BIOS") which controls hardware operations, such as those involving disk drives and the keyboard. RAM 66 is the memory into which an operating system and application programs are loaded. RAM 66 may be partitioned into system memory 68 and user memory 78. System memory 68 can be accessed only by certain programs or devices. Whereas, user memory 78 can be accessed by both applications that cannot access system memory 68 and by devices or applications that are able to access system memory 68.

System unit 52 also contains input/output ("I/O") controllers: a keyboard controller 72, a mouse controller 74, and a video controller 76. These three controllers are connected to system bus 60. Keyboard controller 72 provides a hardware interface for keyboard 56, mouse controller 29 provides a hardware interface from mouse 58, and video controller 76 provides a hardware interface for the video display terminal 54.

A memory management chip 78 connected to system bus 60 and controls direct memory access ("DMA") operations, including paging data between RAM 66 and a hard disk drive 80 and a floppy disk drive 82.

The hardware depicted in FIGS. 1 and 2 may vary for specific applications. For example, other peripheral devices such as optical disk media, printers, modems, and the like may be used in addition to or in place of the hardware already shown.

Figure 3:
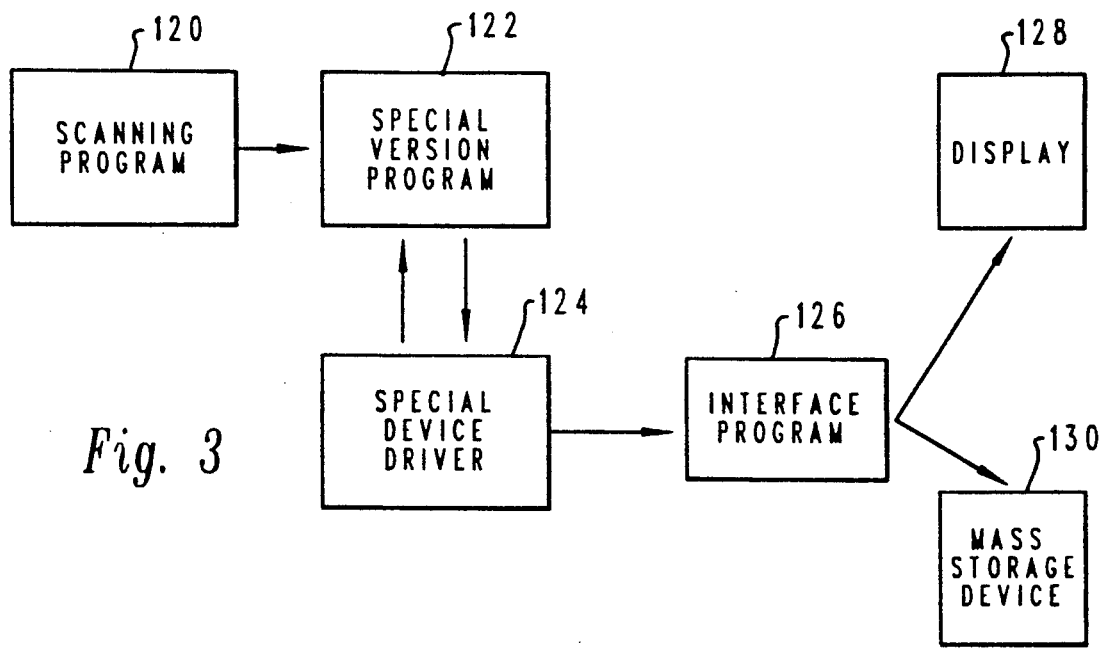
FIG. 3 depicts a high level diagram of a method and system which may be utilized to implement a preferred embodiment of the preferred invention for measuring time intervals during which external interrupts are inhibited.

FIG. 3 depicts a high level diagram of a method and system under a preferred embodiment of the present invention for measuring time intervals during which external interrupts are inhibited. Within a computer system 118, a scanning program 120 is utilized to scan source code for any instruction that could potentially block or unblock interrupts and insert immediately before each of these instructions a benign fault, such as an invalid opcode. A benign fault is a fault that allows a program to continue execution after the occurrence of the fault The invalid opcode inserted under a preferred embodiment of the present invention is a unique invalid opcode not generally utilized by the microprocessor.

Scanning program 120 produces a special version program 122 from the modified source code. Special version program 122 is executed and, as invalid opcode faults occur, special device driver 124 intercepts these opcode faults and determines whether the opcode faults are caused by an invalid opcodes inserted by scanning program 120. If the invalid opcode fault is not a fault which has been inserted by scanning program 120, special device driver 124 returns control to the normal invalid opcode fault handling path (not shown), and the default will be handled in the normal manner. Otherwise, special device driver 124 performs some processing, modifies the return address on the stack to point to the instruction following the faulting invalid opcode and then returns to special version program 122.

Special device driver 124 also calculates interrupt blocking times and maintains various statistics such as maximum interrupt-blocking time measured thus far or interrupt-blocking times that exceed a certain limit. Special device driver 124 has access to system memory and records various statistics into memory buffers belonging to an interface program 126. Interface program 126 reads the data in these memory buffers and may display them on a 128 video display terminal or place the contents of the memory buffer into a mass storage device 130. The displaying of data on video display terminal 128 may be done in a real-time manner.

One way to implement the method for building a special version source code is to use a scanning program that can scan the source code for any instruction that could potentially block or unblock interrupts such as the CLI, STI, POPF, POPFD, IRET, and IRETD instructions in the Intel 80386 architecture, and thereafter insert immediately before each of these instructions an invalid opcode. A set of command files would be used to run the scanning program on each source file and rebuild the modified source code into a special version source code. Thus, when the special version source code is processed, an invalid opcode fault will be generated just before each instruction which may block or unblock interrupts is executed and the invalid opcode fault handling code will be entered.

Figure 4:
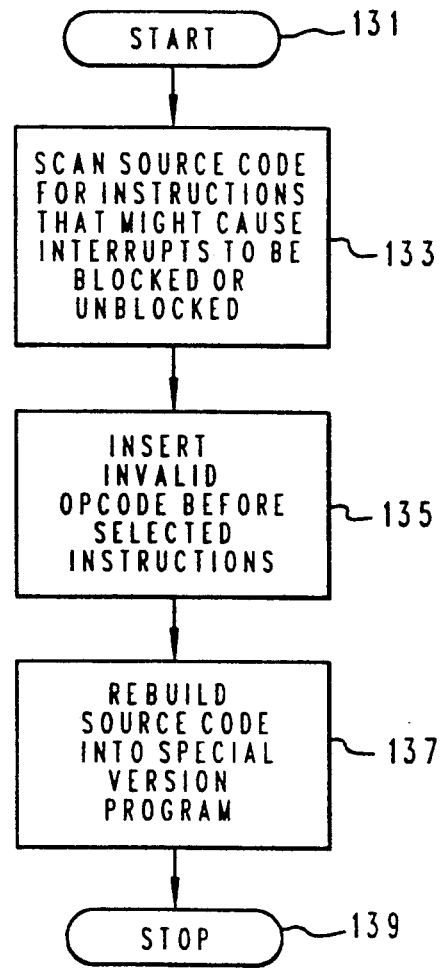
FIG. 4 is a high level flow chart of a process which may be utilized for building a special version program for the in accordance with a preferred embodiment of the present invention.

FIG. 4 is a high level flow chart of a process for building a special version program for use in measuring interrupt blocking times in accordance with a preferred embodiment of the present invention. As illustrated, the process begins at block 131 and thereafter passes to block 133 which illustrates scanning the source code of interest for instructions that might cause interrupts to be blocked or unblocked. Block 135 shows inserting an invalid opcode before selected instructions found. The process then proceeds to block 137, which illustrates rebuilding the source code, into a special version program for testing. Thereafter the process terminates in block 139.

To monitor these invalid opcodes, some private code may be added to the normal fault handling path for invalid opcode faults. This private code may be installed as part of a special device driver that is capable of intercepting every invalid fault before the normal invalid opcode fault handler of the operating system's kernel is entered. The initialization routine of this special device driver will modify the interrupt vector table entry for invalid opcode faults, so that, upon the occurrence of each of these faults, the processor will vector directly to some entry point inside this special device driver when a fault occurs.

Figure 5:
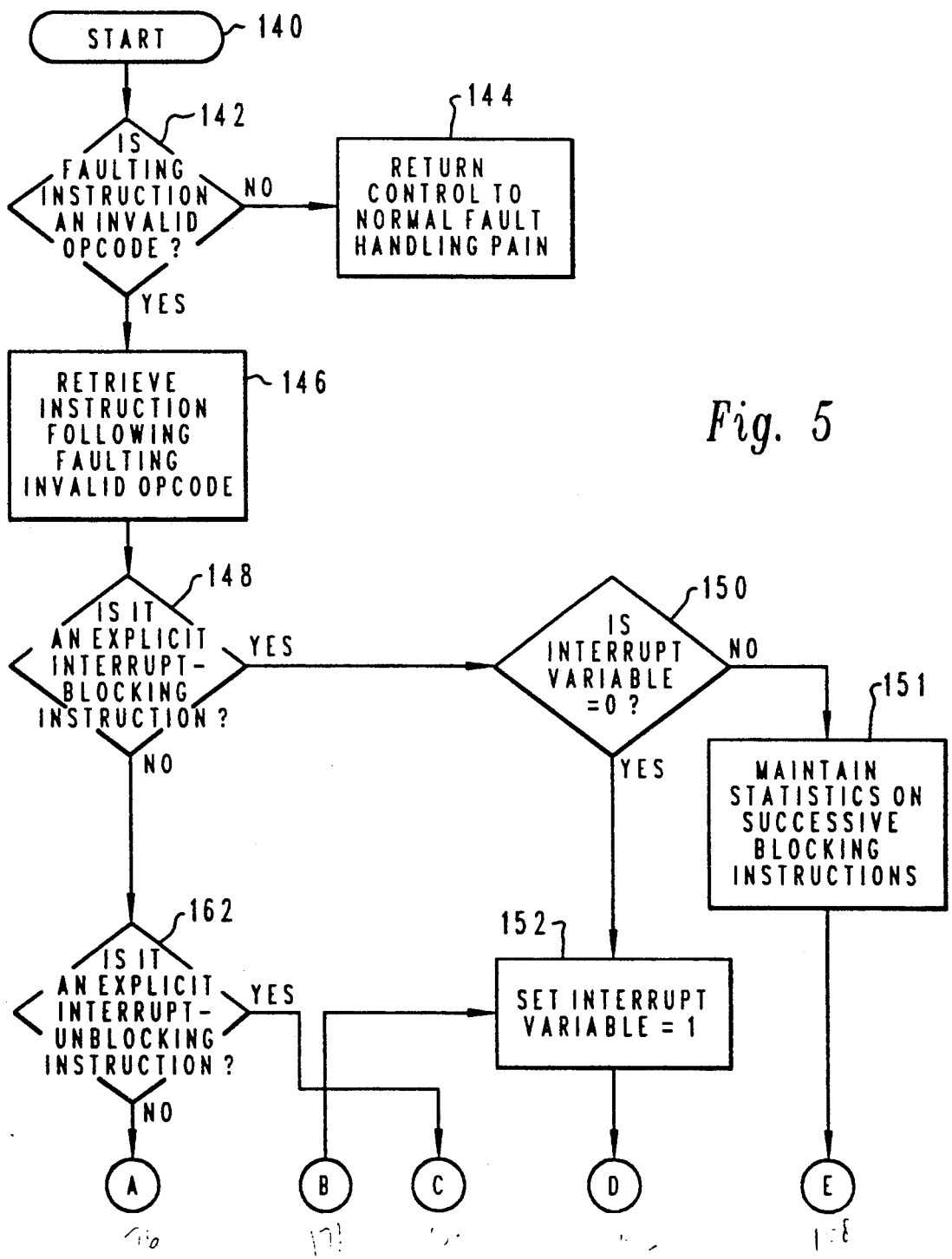
FIGS. 5 and 5A depicts a high level block diagram of a special device driver which may be utilized for monitoring faults in a preferred embodiment of the present invention.

FIG. 5 depicts a high level block diagram of a special device driver for monitoring faults in a preferred embodiment of the present invention. As illustrated, the process begins at block 140 when a fault occurs and thereafter passes to block 142 which shows determining whether the faulting instruction is an invalid opcode inserted by the scanning program. If the faulting instruction is not one inserted by the scanning program, the process then proceeds to block 144 which illustrates returning control to the normal invalid opcode fault handling path.

Referring back to block 142 if the faulting instruction is an invalid opcode inserted by the scanning program the process proceeds to block 146 which shows retrieving the next instruction following the faulting invalid opcode. The process then proceeds to block 148 which illustrates determining whether the instruction following the invalid opcode is an explicit interrupt-blocking instruction.

If the instruction following the invalid opcode is an explicit interrupt-blocking instruction, the process then proceeds to block 150 which shows making a determination as to whether the interrupt variable is equal to zero. The interrupt status variable is initially set equal to zero. If the interrupt variable is equal to zero, the process then proceeds to block 152, which illustrates setting the interrupt variable equal to one. Then, block 154 shows starting a timer, and block 156 illustrates recording the location of the blocking instruction. Thereafter, the process proceeds to block 158 which shows modifying the return address to get past the faulting invalid opcode. Afterwards, the process terminates as illustrated in block 160 and returns to the special version program.

Referring back to block 150, if the interrupt variable is not equal to zero, the process then proceeds to block 151, illustrating maintaining statistics of successive blocking instructions. Next, the process proceeds to block 158, showing modifying the return address to get past the faulting invalid opcode and then proceeding to block 160, illustrating termination of the process.

Referring back to block 148 if the instruction following the faulting invalid opcode is not an explicit interrupt-blocking instruction, the process then proceeds to block 162 which shows making a determination as to whether the instruction is an explicit interrupt-unblocking instruction. Providing that instruction is an interrupt-unblocking instruction, the process then proceeds to block 164, which illustrates making a determination as to whether the interrupt variable is equal to one.

If the interrupt variable is equal to one, which means the computer system is in an interrupt blocking state, the process then proceeds to block 166, which shows setting the interrupt variable equal to zero. Thereafter, block 168 illustrates stopping the timer, and block 170 shows recording the location of unblocking instructions. Block 172 illustrates calculating interrupt-blocking time. Afterwards, block 174 shows maintaining statistics involving interrupt-blocking times. The process then proceeds to block 158, which shows modifying the return address to get past the faulting invalid opcode. Thereafter, the process terminates as illustrated in block 160 and returns to the special version program.

Referring back to block 164, if the interrupt variable is not equal to one, which means the computer system is not in an interrupt blocking state, the process then proceeds to block 165 which illustrates maintaining statistics on successive interrupt unblocking instructions. Afterwards, the process proceeds to block 158, showing modifying the return address to get past the faulting invalid opcode and then proceeding to block 168, illustrating termination of the process.

Referring back to block 162, if the instruction is not an explicit interrupt-unblocking instruction, the process proceeds to block 176 which illustrates making a determination as to whether the interrupt flag is changed.

If the interrupt flag is changed, that is if the current interrupt flag and stack image of the interrupt flag are different, the process proceeds to block 178, showing a determination as to whether the interrupt variable is equal to zero. If the interrupt variable is equal to zero the process proceeds to block 152 which illustrates setting the interrupt variable equal to one. Afterwards, block 154 shows starting the timer and block 156 illustrates recording location of blocking. The process then proceeds to block 158 which shows modifying the return address to get past the faulting invalid opcode. Thereafter, the process terminates as illustrated in block 160.

Referring back to block 178 if the interrupt variable is not equal to zero the process proceeds to block 166, showing setting the interrupt variable equal to zero. Afterwards, block 168 illustrates stopping the timer and block 170 shows recording the location of unblocking instruction. Calculation of interrupt blocking time is illustrated in block 172. Next, the process proceeds to block 174, which shows maintaining statistics involving interrupt-blocking time. The process then proceeds to block 158 which shows modifying the return address to get past the faulting invalid opcode. Thereafter, the process terminates as illustrated in block 160.

Referring again to block 176, if the interrupt flag is not changed, the process proceeds to block 158 which shows modifying the return address to get past the faulting invalid opcode and the process thereafter terminates, as illustrated in block 160.

Figure 5A:
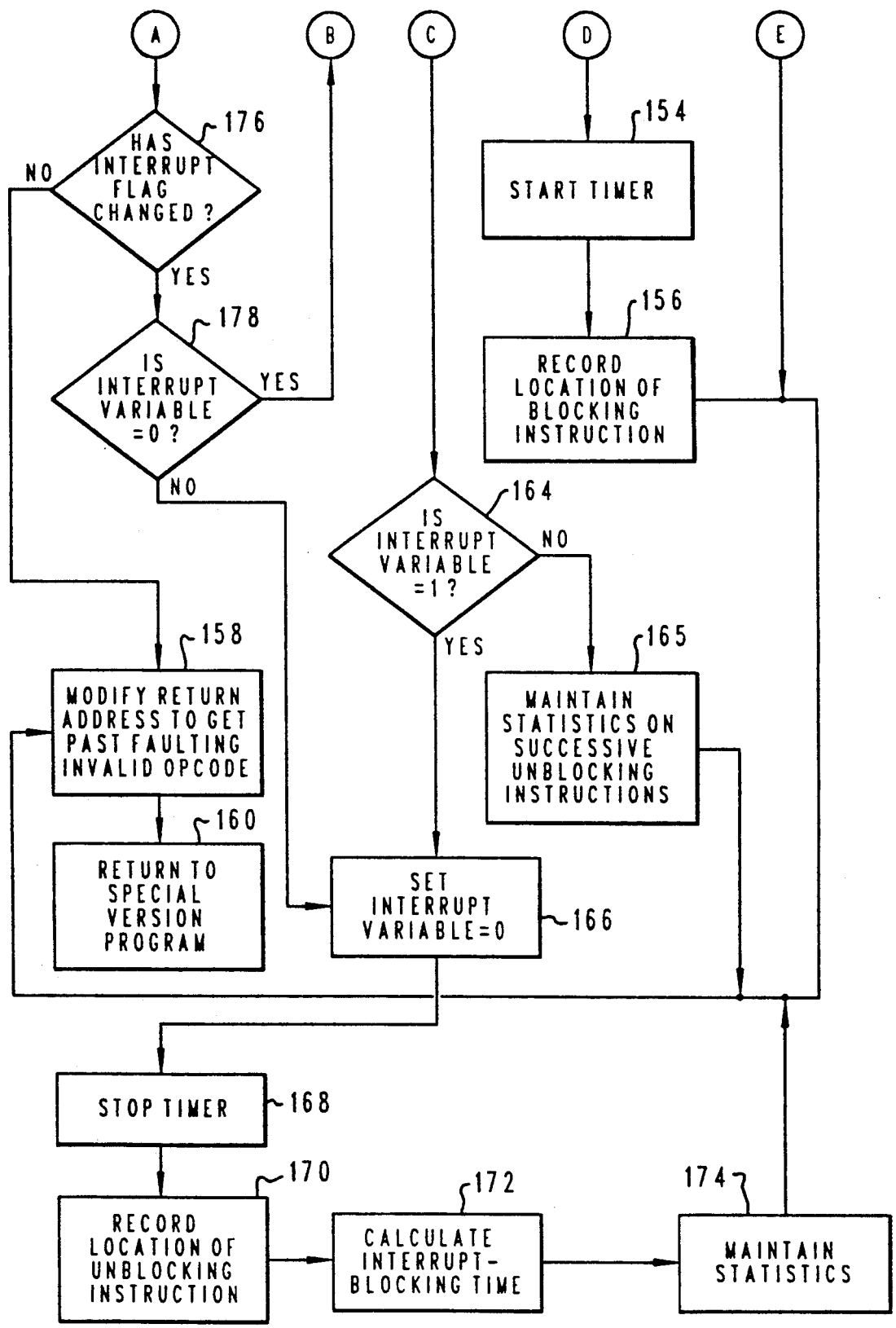

As illustrated in FIGS. 5 and 5A in the case of nested instances of blocking and unblocking external interrupts, the timing interval will start from the outer most instance of blocking to the inner most instance of unblocking. This timing is achieved using the interrupt variable as shown in FIGS. 5 and 5A.

In summary, each instruction following an invalid opcode inserted by the scanning program is examined by the special device driver. If the instruction is an explicit blocking instruction a timer is started. In addition, if the instruction can indirectly block external interrupts, the current state of the interrupt flag is compared with a stack image of the interrupt flag. If the current state of the interrupt flag and the image of the interrupt flag are different and the current interrupt flag is set a timer is also started.

If the instruction examined is an explicit unblocking instruction the timer is stopped. Furthermore, if the instruction can indirectly block external interrupts the current state of the interrupt flag is compared with the stack image of the interrupt flag, and if the interrupt flag and the stack image of the interrupt flag are different and the current interrupt flag is not set, the timer is stopped.

Referring back to block 178, when the interrupt variable is equal to zero, this is, equivalent to a CLI instruction in a 80486 microprocessor. On the other hand, if the interrupt variable in block 178 is not equal to zero, this is equivalent to a STI instruction. Essentially block 176 makes the determination of whether the interrupt flag and its image saved on the stack are the same; and the interrupt variable in block 178 is for checking whether the current interrupt flag is set.

As a result, the method and apparatus of the present invention examine the instruction following the invalid opcode on a dynamic basis to determine whether to start or stop the timer; the timer is not started or stopped on the basis of the invalid opcode used. One feature of the present invention is in the case of nested instances of blocking and on blocking external interrupts, the time interval will start from the outermost instance of blocking to the innermost instance of unblocking as shown in FIGS. 5 and 5A.

Moreover, it is desirable to have the special device driver determine the precise locations of where interrupts are blocked or unblocked in the executed code. Locations of faulting invalid opcodes are usually made available to software on most processors. By offsetting the length of the invalid opcode into these locations, the handler will find exact locations of instructions that actually enable or disable interrupts. In the case of fielding external interrupts, the starting location of the corresponding interrupt handler will be recorded by reading the vector address in the interrupt gate.

It is desirable for the special device driver to maintain historical data on instructions capable of blocking or unblocking interrupts. It is also desirable for the special device driver to calculate and maintain statistics, such as the maximum interrupt-blocking time measured thus far, or interrupt-blocking times that exceed a certain limit. This data, together with the corresponding locations of where the interrupts are blocked and unblocked, can be saved in a memory data buffer accessible to a non-privileged application program. The handler may additionally maintain a circular buffer of the most recent interrupt-blocking intervals or the largest running interrupt-blocking times. Under the present invention, the maximum number of successive blocking and unblocking instructions may also be determined along with the locations of these successive blocking and unblocking instructions. Basically, successive interrupt blocking occurs when the microprocessor is already in a blocking state and another instruction is encountered that calls for blocking the interrupt. Again, this data may be saved and maintained in a memory data buffer or in a mass storage device.

The method and system of the present invention has several advantages over prior systems. For example, unlike the sampling methods, the present invention is able to determine precise locations at which interrupts are blocked and unblocked, since faulting occurs on invalid opcodes just before instructions that can block or unblock interrupts. In addition, since the present invention is not a sampling tool, it is able to track all interrupt-blocking intervals within the executed code. Moreover, the special device driver under the present invention utilizes a timer that starts or stops based upon the type of instruction immediately following the faulting invalid opcode which results in very accurate timing of intervals during which external interrupts are blocked.

The present invention also has several advantages over systems using software hooks in a monitoring system. Unlike putting hooks into the system, the present invention does not require making a careful examination of the source code to find out where interrupts are block or unblocked; the scanning program automatically scans the source code for a small number of instructions that can alter the interrupt flag of the processor and inserts invalid opcodes before them. The special device driver determines whether the instructions actually alter the interrupt flag at run time on a dynamic basis.

Unlike using hooks which do not take into account interrupt-blocking periods caused by indirect means, such as the processor automatically blocking interrupts immediately after being interrupted, the method and system of the present invention can cover this situation by vectoring to some private code used to start the timer from interrupt gates. In addition, the method and system of the present invention does not need to use sophisticated hooks within the operating system, and/or application code to be evaluated. Instead, insertion of invalid opcodes into the source code is automatically done by the scanning program.

In comparison to identification macros systems, the method and system of the present invention is able to consider all cases where interrupts are blocked unlike identification macros.

Although the description of the preferred embodiments were directed at invalid opcodes, the method and system of the present invention may be implemented using any benign or nonfatal fault or invalid instruction recognized by the particular microprocessor system. For example, instead of using invalid opcode faults, things such as debug exceptions, breakpoint, overflow, bounds check, device not available, or floating-point error faults could be utilized with a Intel 80386 or 80486 microprocessor. With other microprocessor systems, any suitable benign or nonfatal fault or invalid instruction supported by the systems may be used to implement the method and system of the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a computer system for monitoring time intervals during which external interrupts are inhibited within said computer system in a selected program being run on said computer system supporting benign faults comprising:
   identifying a first plurality of instructions, said first plurality of instructions for blocking external interrupts;
   identifying a second plurality of instructions, said second plurality of instructions for unblocking external interrupts;
   inserting a benign fault proximate to selected ones of said first plurality of instructions and selected ones of said second plurality of instructions to produce a special version program;
   running said special version program in said computer system;
   monitoring faults occurring during running of said special version program; and
   in response to said benign fault, monitoring external interrupt-blocking times caused by said selected ones of said first plurality of instructions and said selected ones of said second plurality of instructions.

2. The method of claim 1 further comprising maintaining addresses on successive instructions for blocking external interrupts and maintaining addresses on successive instructions for unblocking external interrupts.

3. The method of claim 1, wherein said inserting step further comprises inserting said benign fault immediately before said selected ones of said first plurality of instructions and said selected ones of said second plurality of instructions.

4. The method of claim 1, wherein said unique benign fault is a benign invalid opcode.

5. The method of claim 1, wherein said step of monitoring external interrupt-blocking times caused by said selected ones of said first plurality of instructions and said selected ones of said second plurality of instructions further comprises
   examining each of said selected ones of said first plurality of instructions and said selected ones of said second plurality of instructions;
   starting a timer if a particular one of said selected ones of said first plurality instructions is an explicit blocking instruction; and
   stopping said timer if a particular one of said selected ones of said second plurality of instructions is an explicit unblocking instruction.

6. The method of claim 5 further comprising:
   if said particular one of said selected ones of said first plurality of instructions can indirectly block external interrupts, determining a current state of an interrupt flag and comparing said current state of said interrupt flag with a stack image of said interrupt flag;
   if said particular one of said selected ones of said second plurality of instructions can indirectly block external interrupts, determining a current state of an interrupt flag and comparing said current state of said interrupt flag with a stack image of said interrupt flag;
   if said current state of interrupt flag and said image of said interrupt flag are different and if the computer system is not in an interrupt blocking state, starting said timer; and
   if said current state of said interrupt flag and said stack image of said interrupt flag are different and if said computer system is in an interrupt blocking state, stopping said timer.

7. The method of claim 6 further comprising maintaining historical data on interrupt-blocking times.

8. The method of claim 6 further comprising maintaining historical data on interrupt-unblocking times.

9. The method of claim 8 further comprising determining a maximum external interrupt-blocking time measured during execution of said special version program.

10. The method of claim 6 further comprising determining external interrupt-blocking times.

11. The method of claim 6 further comprising determining a maximum number of successive interrupt-blocking instructions.

12. Method of claim 6 further comprising determining a maximum number of successive interrupt-unblocking instructions.

13. The method of claim 6 further comprising determining locations of interrupts and saving said locations in a memory data buffer.

14. The method of claim 13 further comprising displaying said times and locations on a video display terminal.

15. The method of claim 13 further comprising determining locations of successive interrupt blocking instructions and saving said locations in a memory data buffer.

16. The method of claim 13 further comprising determining locations of successive interrupt unblocking instruction and saving said locations in a memory data buffer.

17. The method of claim 5 further comprising:
   if said particular one of said selected ones of said first plurality of instructions can indirectly block external interrupts, determining a current state of an interrupt flag and comparing said current state of said interrupt flag with a stack image of said interrupt flag;
   if said particular one of said selected ones of said second plurality of instructions can indirectly block external interrupts, determining a current state of an interrupt flag and comparing said current state of said interrupt flag with a stack image of said interrupt flag;
   if said current state of interrupt flag and said image of said interrupt flag are different and if the computer system is not in an interrupt blocking state, starting a second timer; and
   if said current state of said interrupt flag and said stack image of said interrupt flag are different and if said computer system is in an interrupt blocking state, stopping said second timer.

18. A data processing system for monitoring time intervals during which external interrupts are inhibited in a selected program running on a computer system supporting benign faults comprising:
   scanning means for scanning a source code of a selected program and modifying said source code, said scanning means identifying a first plurality of instructions, said first plurality of instructions for blocking external interrupts, and identifying a second plurality of instructions, said second plurality of instructions for unblocking external interrupts, and inserting a benign fault proximate to selected ones of said first plurality of instructions and selected ones of said second plurality of instructions to produce a special version program for running on said computer system;

means for running said special version program;

first monitoring means for monitoring faults occurring during running of said special version program; and second monitoring means for monitoring external interrupt-blocking times caused by said selected ones of said first plurality of instructions and said selected ones of said second plurality of instructions during running of said special version program.

19. The data processing system of claim 18, wherein said means for monitoring external interrupt-blocking times caused by said selected ones of said first plurality of instructions and said selected ones of said second plurality of instructions comprises:

examination means for examining each of said selected ones of said first plurality of instructions and said selected ones of said second plurality of instructions;

means for starting a timer if a particular one of said selected ones of said first plurality instructions is an explicit blocking instruction;

mean for stopping said timer if a particular one of said selected ones of said second plurality of instructions is an explicit unblocking instruction;

means for determining a current state of an interrupt flag and comparing said current state of said interrupt flag with a stack image of said interrupt flag if said particular one of said selected ones of said first plurality of instructions can indirectly block external interrupts;

means for determining a current state of an interrupt flag and comparing said current state of said interrupt flag with a stack image of said interrupt flag if said particular one of said selected ones of said second plurality of instructions can indirectly block external interrupts;

means for starting said timer if said current state of interrupt flag and said image of said interrupt flag are different and said computer system is not in an interrupt blocking state; and means for stopping said timer if said current state of said interrupt flag and said stack image of said interrupt flag are different and said computer system is in an interrupt blocking state.

20. A data processing system for monitoring time intervals during which external interrupts are inhibited in a selected program running on a computer system supporting benign faults comprising:

scanning means for scanning a source code of a selected program and modifying said source code, said scanning means identifying a first plurality of instructions, said first plurality of instructions for blocking external interrupts, identifying a second plurality of instructions, aid second plurality of instructions for unblocking external interrupts, and inserting a benign fault proximate to a selected ones of said first plurality of instructions and a selected ones of said second plurality of instructions to produce a special version program;

means for building a special version program from modified source code for running one said computer system;

means for running said special version program;

means for monitoring faults occurring during running of said special version program;

means for monitoring external interrupt-blocking times caused by said selected ones of said first plurality of instructions and said selected ones of said second plurality of instructions; and means for storing a historical record of data relating to said external interrupt-blocking times for evaluation.

21. The data processing system of claim 20, wherein said means for monitoring external interrupt-blocking times caused by said selected ones of said first plurality of instructions and said selected ones of said second plurality of instructions further comprises:

examination means for examining means of said selected ones of said first plurality of instructions and said selected ones of said second plurality of instructions;

means, responsive to said examination means, for starting a timer of a particular one of said selected ones of said first plurality instructions is an explicit blocking instruction; and means, responsive to said examination means, for stopping said timer if a particular one of said selected ones of said second plurality of instructions is an explicit unblocking instruction.

22. The data processing system of claim 21, wherein said means for monitoring external interrupt-blocking times caused by said selected ones of said first plurality of instructions and said second plurality of instructions further comprising:

means determining a current state of an interrupt flag and comparing said current state of said interrupt flag with a stack image of said interrupt flag if said particular one of said selected ones of said first plurality of instructions can indirectly block external interrupts;

means for determining a current state of an interrupt flag and comparing said current sate of said interrupt flag with a stack image of said interrupt flag if said particular one of said selected ones of said second plurality of instructions can indirectly block external interrupts;

means for starting a timer if said current state of interrupt flag and said image of said interrupt flag are different and if the computer system is not in an interrupt blocking state; and means for stopping said timer if said current state of said interrupt flag and said stack image of said interrupt flag are different and if said computer system is in an interrupt blocking state.

23. The data processing system of claim 20 wherein said means for storing said historical record of data relating to said external interrupt-blocking times includes means for storing historical data an interrupt-blocking times and interrupt-blocking means.

24. The data processing system of claim 20, wherein said means for storing historical data relating to said external interrupt-blocking times includes means for storing addresses on instructions blocking external interrupts and means for storing addresses on instructions unblocking external interrupts.

25. The data processing system of claim 20 further including means for determining external interrupt-blocking times.

26. The data processing system of claim 20 further including means for determining a maximum number of successive interrupt-blocking instructions and a maximum number of successive interrupt-blocking instruction.

27. A method in a computer system for monitoring intervals during which external interrupts are inhibited within the computer system in a selected program being executed on the computer system, wherein the computer system supports benign faults, the method comprising the computer implemented steps of:
- scanning the selected program, wherein the selected program includes a plurality of instructions;
- responsive to the scanning step, identifying a first number of instructions, the first number of instructions for blocking external interrupts;
- responsive to the scanning step, identifying a second number of instructions, the second number of instructions for unblocking external interrupts;
- in response to identifying a first number of instructions, selecting a first subset of instruction from the first number of instructions;
- in response to identifying a second number of instructions, selecting a second subset of instructions from the second number of instructions;
- for each instruction in the first subset and the second subset, inserting a benign fault in a location that is proximate to the instruction, wherein a modified plurality of instructions is created;
- creating a special version of programs from the modified plurality of instructions;
- executing the special version program in the computer system; and
- monitoring for occurrences of faults occurring during the execution of the special version program; and
- in response to an occurrence of a fault caused by a benign fault, monitoring the external interrupt-blocking times caused by the first subset and the second subset.

28. The method of claim 27, wherein the inserting step further comprises inserting a benign fault in a location immediately before each instruction in the first subset and the second subset, wherein each benign fault is uniquely identifiable such that no two benign faults are alike.

29. A computer system for monitoring intervals during which external interrupts are inhibited within the computer system in a selected program being executed on the computer system, wherein the computer system supports benign faults, computer system comprising:
- scanning means for scanning the selected program, wherein the selected program includes a plurality of instructions;
- identification means, responsive to the scanning means, for identifying a first number of instructions, the first number of instructions for blocking external interrupts and for identifying a second number of instructions, the second number of instructions for unblocking external interrupts;
- selection means, responsive to the identification means, for selecting a first subset of instruction from the first number of instructions and for selecting a second subset of instructions from the second number of instructions;
- insertion means for inserting, for each instruction in the first subset and the second subset, a benign fault in a location that is proximate to the instruction, resulting in a set of modified instructions, including the plurality of instructions and the inserted instructions;
- means for creating a special version program from the set of modified instructions;
- means for securing the special version program in the computer system; and
- monitoring means for monitoring occurrences of faults occurring during the execution of the special version program and for monitoring the external interrupt-blocking times caused by the first subset and the second subset in response to an occurrence of a fault caused by a benign fault.

30. The computer system method of claim 29, wherein the insertion means further comprises means for inserting a benign fault in a location immediately before each instruction in the first subset and the second subset, wherein each benign fault is uniquely identifiable such that not two benign faults are alike.

* * * * *